(12) United States Patent
Nakanishi et al.

(10) Patent No.: US 9,831,494 B2
(45) Date of Patent: Nov. 28, 2017

(54) NEGATIVE-ELECTRODE ACTIVE MATERIAL AND ELECTRIC STORAGE APPARATUS

(71) Applicant: KABUSHIKI KAISHA TOYOTA JIDOSHOKKI, Kariya-shi, Aichi (JP)

(72) Inventors: Masataka Nakanishi, Kariya (JP); Yusuke Sugiyama, Kariya (JP); Takashi Mori, Kariya (JP); Hiroshi Hirate, Kariya (JP); Masakazu Murase, Kariya (JP)

(73) Assignee: KABUSHIKI KAISHA TOYOTA JIDOSHOKKI, Kariya-shi (JP)

( * ) Notice: Subject to any disclaimer, the term of this patent is extended or adjusted under 35 U.S.C. 154(b) by 139 days.

(21) Appl. No.: 14/438,278

(22) PCT Filed: Nov. 15, 2013

(86) PCT No.: PCT/JP2013/006723
§ 371 (c)(1),
(2) Date: Apr. 24, 2015

(87) PCT Pub. No.: WO2014/080603
PCT Pub. Date: May 30, 2014

(65) Prior Publication Data
US 2015/0295230 A1 Oct. 15, 2015

(30) Foreign Application Priority Data

Nov. 21, 2012 (JP) .................................. 2012-255177

(51) Int. Cl.

| | |
|---|---|
| *H01M 4/36* | (2006.01) |
| *H01M 4/13* | (2010.01) |
| *H01M 4/38* | (2006.01) |
| *H01M 4/90* | (2006.01) |
| *H01M 4/62* | (2006.01) |
| *H01M 4/58* | (2010.01) |
| *H01M 4/48* | (2010.01) |
| *C08L 83/16* | (2006.01) |
| *H01M 4/60* | (2006.01) |
| *C08G 77/60* | (2006.01) |
| *H01M 10/0525* | (2010.01) |

(52) U.S. Cl.
CPC .............. *H01M 4/366* (2013.01); *C08L 83/16* (2013.01); *H01M 4/13* (2013.01); *H01M 4/38* (2013.01); *H01M 4/386* (2013.01); *H01M 4/483* (2013.01); *H01M 4/58* (2013.01); *H01M 4/60* (2013.01); *H01M 4/623* (2013.01); *C08G 77/60* (2013.01); *H01M 10/0525* (2013.01)

(58) Field of Classification Search
CPC .......... H01M 4/13; H01M 4/58; H01M 4/386; H01M 4/483; H01M 4/38; H01M 4/60; H01M 4/623; H01M 4/366; H01M 10/0525; C08L 83/16; Y02E 60/122; C08G 77/60
See application file for complete search history.

(56) References Cited

U.S. PATENT DOCUMENTS

2011/0287317 A1    11/2011    Nakanishi

FOREIGN PATENT DOCUMENTS

| JP | 2004-288564 A | 10/2004 |
|---|---|---|
| JP | 2007-5201 A | 1/2007 |
| JP | 3865033 B2 | 1/2007 |
| JP | 2008-210576 A | 9/2008 |
| JP | 2009-102219 A | 5/2009 |
| JP | 2010-218848 A | 9/2010 |
| JP | 2011-90806 A | 5/2011 |
| JP | 2012-9421 A | 1/2012 |
| JP | 2012-59509 A | 3/2012 |
| JP | 2013-234088 A | 11/2013 |

OTHER PUBLICATIONS

H.D. Fuchs et al., "Porous silicon and siloxene: Vibrational and structural properties", Physical Review B, Sep. 15, 1993, pp. 8172-8189, vol. 48, No. 11.
International Search Report for PCT/JP2013/006723 dated Jan. 21, 2014.

*Primary Examiner* — Muhammad S Siddiquee
(74) *Attorney, Agent, or Firm* — Sughrue Mion, PLLC (57) ABSTRACT

A negative-electrode active material is provided, the negative-electrode active material including: a lamellar polysilane having a structure in which multiple six-membered rings constituted of a silicon atom are disposed one after another, and expressed by a compositional formula, $(SiH)_n$, as a basic skeleton; and the negative-electrode active material containing copper in an amount of from 0.01 to 50% by mass. To contain copper results in upgrading electron conductivity. Consequently, an electric storage apparatus using the negative-electrode active material for one of the negative electrodes has upgraded rate characteristic, and also has augmented charged and discharged capacities.

18 Claims, 5 Drawing Sheets

NEGATIVE-ELECTRODE ACTIVE MATERIAL AND ELECTRIC STORAGE APPARATUS

CROSS REFERENCE TO RELATED APPLICATIONS

This application is a National Stage of International Application No. PCT/JP2013/006723 filed Nov. 15, 2013, claiming priority based on Japanese Patent Application No. 2012-255177 filed Nov. 21, 2012, the contents of all of which are incorporated herein by reference in their entirety.

TECHNICAL FIELD

The present invention relates to a negative-electrode active material used for electric storage apparatuses such as lithium-ion secondary batteries, and to an electric storage apparatus such as secondary batteries, electric double-layer capacitors and lithium-ion capacitors using the negative-electrode active material, respectively.

BACKGROUND ART

Lithium-ion secondary batteries have high charged and discharged capacities, and are batteries being able to make the outputs high. Currently, the lithium-ion secondary batteries have been used mainly as power sources for portable electronic appliances, and have further been expected as power sources for electric automobiles anticipated to become widespread from now on. The lithium-ion secondary batteries comprise active materials being capable of inserting and eliminating (or sorbing and desorbing) lithium (Li) in the positive electrode and negative electrode, respectively. And, lithium ions moving within an electrolytic solution disposed between the two electrodes lead to operating the lithium-ion secondary batteries.

In the lithium-ion secondary batteries, a lithium-containing metallic composite oxide, such as lithium/cobalt composite oxides, has been used mainly as an active material of the positive electrode; whereas a carbon material having a multi layered structure has been used mainly as an active material of the negative electrode. The performance of the lithium-ion secondary batteries is dependent on materials of the positive electrode, negative electrode and electrolyte constituting the secondary batteries. Even among the materials, researches and developments of active-material ingredients forming the active materials have been carried out actively. For example, silicon or silicon oxides having a higher capacity than the capacity of carbon have been investigated as a negative-electrode active-material ingredient.

Using silicon as a negative-electrode active material enables a battery to have a higher capacity than using a carbon material. However, silicon exhibits a large volumetric changes accompanied by occluding and releasing (or sorbing and desorbing) lithium (Li) at the time of charging and discharging operations. Consequently, silicon has been pulverized finely to peel off or come off from a current collector, and thereby such a problematic issue arises probably that the charging/discharging cycle longevity of a battery is short. Hence, using a silicon oxide as a negative-electrode active material enables the volumetric changes accompanied by sorbing and desorbing lithium (Li) at the time of charging and discharging operations to be inhibited more than using silicon.

For example, employing as a negative-electrode active material silicon oxide (e.g., $SiO_x$ where "x" is $0.5 \leq$"x"$\leq 1.5$ approximately) has been investigated. The $SiO_x$ has been known to decompose into Si and $SiO_2$ when being heat treated. The decomposition is referred to as a "disproportionation reaction," the $SiO_x$ separates into two phases, an Si phase and an $SiO_2$ phase, by the internal reactions of solid. The Si phase separated to be obtainable is very fine. Moreover, the $SiO_2$ phase covering the Si phase possesses an action of inhibiting electrolytic solutions from being decomposed. Therefore, a secondary battery, which uses a negative-electrode active material composed of the $SiO_x$ having been decomposed into Si and $SiO_2$, excels in the cyclability.

The finer silicon particles constituting the Si phase of the above-mentioned $SiO_x$ are, the more a secondary battery using the particles as a negative-electrode active material is upgraded in the cyclability. Hence, Japanese Patent No. 3865033 (i.e., Patent Application Publication No. 1) sets forth a process for producing $SiO_x$ by heating metallic silicon and $SiO_2$ to sublime in order to turn the metallic silicon and $SiO_2$ into a silicon oxide gas, and then cooling the silicon oxide gas. The process enables the particle diameters of the silicon particles constituting the Si phase to exhibit such a nanometer size as from 1 nm to 5 nm.

Moreover, Japanese Unexamined Patent Publication (KOKAI) Gazette No. 2009-102219 (i.e., Patent Application Publication No. 2) sets forth a production process in which a silicon raw material is decomposed down to the elemental states in a high-temperature plasma, the decomposed silicon raw material is cooled quickly down to a liquid nitrogen temperature to obtain nanometer-size silicon particles, and the nanometer-size silicon particles are fixated into an $SiO_2$—$TiO_2$ matrix by a sol-gel method, and the like.

However, according to the production process set forth in Patent Application Publication No. 1, the matrix is limited to subliming materials. Moreover, according to the production process set forth in Patent Application Publication No. 2, a high energy has comes to be needed for plasma discharge. In addition, the silicon composites obtained by the production processes have such a drawback that the dispersibility of Si-phase silicon particles is so low that the particles are likely to agglomerate. When the Si particles agglomerate one another so that the particle diameters become large, a secondary battery using the agglomerated Si particles has a low initial capacity, and the cyclability also declines. Moreover, in the case of the techniques set forth in Patent Application Publication Nos. 1 and 2, since an oxide layer is needed to fixate nanometer-size silicon upon producing the silicon particles, the techniques cause an irreversible reaction to occur between the oxide layer and Li, and associate with a drawback of bringing about capacity declines as a cell.

Incidentally, nanometer-size silicon materials, which have been expected to be utilized in fields such as semiconductors, electric and electronic engineering, have been developed in recent years. For example, Physical Review B (1993), vol. 48, pp. 8,172-8,189 (i.e., Non-patent Literature No. 1) sets forth a process in which a lamellar polysilane is synthesized by reacting hydrogen chloride (HCl) and calcium disilicide ($CaSi_2$) one another. The article further sets forth that the thus obtained lamellar polysilane is utilizable for light-emitting devices, and the like.

And, Japanese Unexamined Patent Publication (KOKAI) Gazette No. 2011-090806 sets forth a lithium-ion secondary battery using a lamellar polysilane as a negative-electrode active material.

Patent Literature

Patent Application Publication No. 1: Japanese Patent Gazette No. 3865033;
Patent Application Publication No. 2: Japanese Unexamined Patent Publication (KOKAI) Gazette No. 2009-102219; and
Patent Application Publication No. 3: Japanese Unexamined Patent Publication (KOKAI) Gazette No. 2011-090806

Non-Patent Literature

Non-patent Literature No. 1: Physical Review B (1993), vol. 48, pp. 8,172-8,189

SUMMARY OF THE INVENTION

Technical Problem

However, the negative-electrode active material composed of the lamellar polysilane set forth in Patent Application Publication No. 3 had low electron conductivity, and had still insufficient rate characteristic. Moreover, the initial efficiency was also insufficient. The present invention is made in view of such circumstances. An object of the present invention is to provide a negative-electrode active material with upgraded electron conductivity, and to provide an electric storage apparatus using the negative-electrode active material for one of the negative electrodes.

Solution to Problem

Features of a negative-electrode active material according to the present invention solving the aforementioned technical problems lie in that the negative-electrode active material comprises: a lamellar polysilane having a structure in which multiple six-membered rings constituted of a silicon atom are disposed one after another, and expressed by a compositional formula, $(SiH)_n$, as a basic skeleton; and the negative-electrode active material contains copper in an amount of from 0.01 to 50% by mass.

Moreover, features of another negative-electrode active material according to the present invention lie in that the negative-electrode active material comprises: a nanometer-size silicon material made by heat treating a lamellar polysilane including copper at a temperature beyond 300° C. under a nonoxidizing atmosphere excepting a nitrogen gas; and the nanometer-size silicon material made by laminating a plate-shaped silicon body in a quantity of multiple pieces one after another in a thickness direction.

And, a feature of an electric storage apparatus according to the present invention lies in that the electric storage apparatus comprises one of the present negative-electrode active material.

Advantageous Effects of the Invention

In accordance with a negative-electrode active material according to the present invention, containing copper results in upgrading the electron conductivity. Consequently, an electric storage apparatus using the negative-electrode active material for one of the negative electrodes has upgraded rate characteristic.

DESCRIPTION OF THE EMBODIMENTS

A negative-electrode active material directed a first invention comprises: a lamellar polysilane having a structure in which multiple six-membered rings constituted of a silicon atom are disposed one after another, and expressed by a compositional formula, $(SiH)_n$, as a basic skeleton. The structure is the same as the lamellar polysilane produced by the production process set forth in Non-patent Literature No. 1, but containing copper is distinct.

The copper is included within a range of from 0.01 to 50% by mass in the negative-electrode active material. A content of the copper being less 0.01% by mass is not practical, because the upgrade of electron conductivity becomes slightly. Moreover, when a content of the copper exceeds 50% by mass, an amount of the lamellar polysilane decreases relatively so that charged and discharged capacities have declined extremely.

To have the copper contained in the lamellar polysilane, the following are available: a method of mixing a copper powder with a lamellar polysilane produced by the process set forth in Non-patent Literature No. 1; or a method of admixing a compound including copper upon producing a lamellar polysilane by the process set forth in Non-patent Literature No. 1. In accordance with the latter method, a binding force between the lamellar polysilane and copper is believed to upgrade, and thereby charged and discharged capacities upgrade when making an electric storage apparatus, compared with a mixture in which the copper powder is simply mixed.

A preferable average particle diameter of the copper powder when the copper powder is mixed by the former method is set to fall within a range of the interlayer distance between the lamellar-polysilane layers. By thus setting the average particle diameter, copper particles are believed to go into the interlayers between the lamellar polysilanes to cover the lamellar polysilanes. Consequently, the lamellar polysilanes are prevented from being oxidized, so that an irreversible capacity declines. Moreover, the expansions and contractions at the time of charging and discharging operations are inhibited, and thereby cyclability upgrades. In addition, the copper burying the pores and interlayers in the lamellar polysilanes results in decreasing a specific surface area, so that preventing declined irreversible capacities resulting from the generation of SEI is also possible.

In the latter method, calcium disilicide ($CaSi_2$), an acid pulling off calcium (Ca) from the calcium disilicide ($CaSi_2$), and a compound including copper are reacted one another. Note herein that hydrogen chloride (HCl), or a mixture of hydrogen chloride (HCl) and hydrogen fluoride (HF) is usable as the acid pulling off calcium (Ca) from the calcium disilicide ($CaSi_2$).

Moreover, as for the compound including copper, although metallic copper is allowable, a compound dissolving in an aqueous solution of the acid pulling off calcium (Ca) from calcium disilicide ($CaSi_2$) is desirable. By thus setting the compound, copper grows on the lamellar polysilanes at the time of reaction, so that the copper and lamellar polysilanes are believed to come to plane contact one another to enhance the binding strength.

Incidentally, since the lamellar polysilane produced using hydrogen chloride (HCl) as set forth in Non-patent Literature No. 1 has a large specific surface area and includes the $SnO_2$ component abundantly, the lamellar polysilane has been associated with such a drawback that the lamellar polysilane is not suitable as for lithium-ion secondary-battery negative-electrode active-material ingredient. For example, in the negative electrode of a lithium-ion secondary battery, an irreversible capacity consumed by the negative electrode is large because decompositions of the electrolytic solution are facilitated when the specific surface area is large, so that turning the lithium-ion secondary battery into a high-capacity lithium-ion secondary battery is difficult. Moreover, although being Si does not result in any problem, containing the $SiO_2$ component abundantly in the negative-electrode active material has been known to cause degradations in the initial characteristic.

Hence, as the result of wholehearted studies, the following became apparent: depending on the production conditions of lamellar polysilane, the specific surface area and oxygen amount of obtainable lamellar polysilane change; and the specific surface area and oxygen amount of nanometer-size silicon material obtainable by heat treating the lamellar polysilane also change. In Non-patent Literature No. 1 and Patent Application Publication No. 3, the lamellar polysilanes are obtained by reacting hydrogen chloride (HCl) and calcium disilicide ($CaSi_2$) one another.

However, using a mixture of hydrogen fluoride (HF) and hydrogen chloride (HCl) as the acid for pulling off Ca made the following apparent: the oxygen content of obtainable lamellar polysilane and nanometer-size silicon material becomes less, though the specific surface area augments. Hereinafter, the method using hydrogen chloride (HCl) is referred to as a first production process; whereas the method using a mixture of hydrogen fluoride (HF) and hydrogen chloride (HCl) is referred to as a second production process.

First Production Process

In the first production process, hydrogen chloride (HCl), calcium disilicide ($CaSi_2$), and a compound of copper are reacted one another. The calcium disilicide ($CaSi_2$) has a lamellar crystal in which Ca-atom layers are inserted between the (111) planes of diamond-type Si, then the calcium (Ca) is pulled off therefrom by the reaction with an acid, and thereby a lamellar polysilane is obtainable.

During the reaction, copper grows on the lamellar polysilanes, so that the copper and polysilanes come to plane contact one another to enhance the binding strength of the copper.

Second Production Process

In the second production process, a mixture of hydrogen fluoride (HF) and hydrogen chloride (HCl), calcium disilicide ($CaSi_2$), and a compound of copper are reacted one another.

In the second production process, a mixture of hydrogen fluoride (HF) and hydrogen chloride (HCl) is used as an acid. Using hydrogen fluoride (HF) leads to etching SiO generating during the synthesis or during the purification, and accordingly the oxygen amount is reduced. Even when using hydrogen fluoride (HF) alone, a lamellar polysilane is obtainable, but using hydrogen fluoride (HF) alone is not preferable because the lamellar polysilane is highly active so as to be oxidized by a trace amount of air to conversely augment the oxygen amount. Moreover, when using hydrogen chloride (HCl) alone, since the setting becomes identical with the first production process, only a lamellar polysilane of which the oxygen amount is abundant is obtainable.

A desirable compositional ratio between the hydrogen fluoride (HF) and the hydrogen chloride (HCl) falls in such a range as HF/HCl=from 1/10,000 to 1/1 by mol. An amount of the hydrogen fluoride (HF) being more than the ratio is not preferable, because impurities, such as $CaF_2$ and CaSiO-based impurities, generate and because separating the impurities from a lamellar polysilane is difficult. Moreover, when an amount of the hydrogen fluoride (HF) becomes less than the ratio, such a case arises probably as the effect of etching resulting from HF weakens.

A desirable blending ratio between the mixture of hydrogen fluoride (HF) and hydrogen chloride (HC) and the calcium disilicide ($CaSi_2$) is to set the acids more excessive than the equivalent to the latter. In an actual reaction, the hydrogen fluoride (HF) and Si react one another as a side reaction so that $SiF_4$ occurs but $CaF_2$ hardly generates. Moreover, the reaction is carried out under such a desirable reaction atmosphere as under a vacuum or under an inert-gas atmosphere. Carrying out the reaction under a nitrogen-gas atmosphere is not preferable, because such a possibility arises as silicon nitride (SiN) generates. Note that the second production process was also revealed to make the reaction time short compared with the first production process. Since Si and HF further react one another so that $SiF_4$ has occurred when the reaction time is too long, a sufficient reaction time is from 0.25 to 24 hours approximately. Even when the reaction temperature is set at room temperature, the mixture, and the calcium disilicide ($CaSi_2$) react one another with ease.

Although the reaction results in generating $CaCl_2$, and the like, the purification of a lamellar polysilane including copper is easy because the by-products are easily removable by washing with water.

Negative-Electrode Active Material According to Second Invention

The present negative-electrode active material comprises a nanometer-size silicon material made by heat treating the lamellar polysilane including copper according to the present invention at a temperature beyond 300° C. under a nonoxidizing atmosphere excepting a nitrogen gas.

As for the nonoxidizing atmosphere, an inert-gas atmosphere, or a vacuum atmosphere is exemplified. A nitrogen-gas atmosphere is not preferable, because such a case arises as silicon nitride generates. Moreover, a preferable heat-treatment temperature falls in a range of from 300° C. to 800° C., and an especially preferable heat-treatment temperature falls in a range of from 400° C. to 600° C.

Although the specific surface area of a lamellar polysilane produced by the first production process is as relatively small as about 20 m²/g approximately, the specific surface area of a lamellar polysilane produced by the second production process is as large as about 122.3 m²/g approximately.

The specific surface area of a nanometer-size silicon material obtained by heat treating the lamellar polysilane produced by the first production process is as small as about 7 m²/g approximately; whereas the specific surface area of a nanometer-size silicon material obtained by heat treating the lamellar polysilane produced by the second production process is as slightly large as about 55 m²/g or less. However, in any of the nanometer-size silicon materials, the specific surface areas become small compared with the lamellar polysilanes.

Moreover, although the oxygen amount of the lamellar polysilane produced by the first product ion process is as relatively abundant as about 40% by mass, the oxygen amount of the lamellar polysilane produced by the second production process is as extremely less as 30% by mass or less. Note that the oxygen amounts are numerical values measured with an energy-dispersion X-ray spectroscopy (or EDX).

And, although the oxygen amount of the nanometer-size silicon material obtained by heat treating the lamellar polysilane produced by the first production process is as relatively large as about 39% by mass, the oxygen amount of the nanometer-size silicon material obtained by heat treating the lamellar polysilane produced by the second production process is as extremely small as 20% by mass or less.

Figure 1:
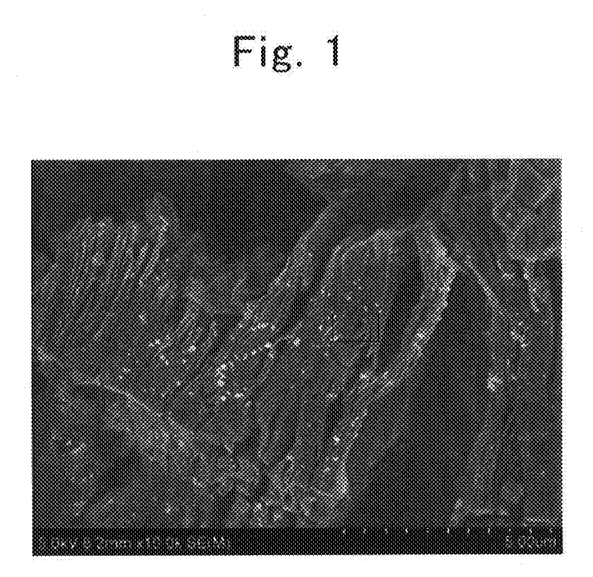
FIG. 1 shows an SEM image of a nanometer-size silicon material.
Figure 2:
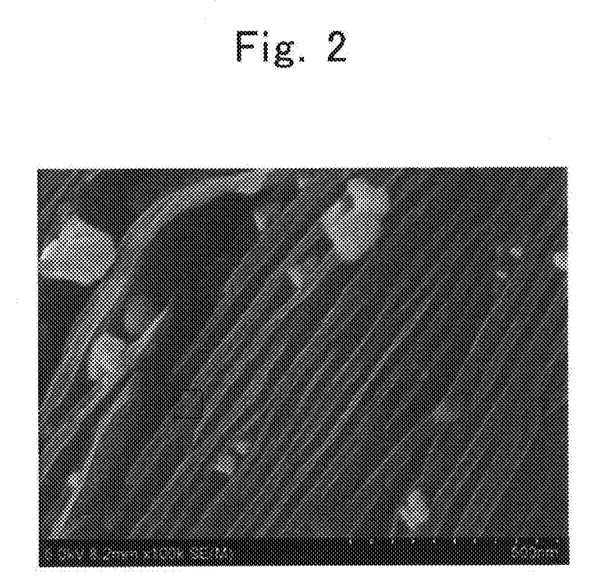
FIG. 2 shows an enlarged SEM image of the nanometer-size silicon material.

The thus obtainable nanometer-size silicon materials comprise a structure made by laminating a plate-shaped silicon body in a quantity of multiple pieces one after another in the thickness direction. As shown in FIGS. 1 and 2, the structure is ascertainable by an SEM observation. Note that FIG. 2 shows a diagram in which the rectangled part shown in FIG. 1 is enlarged. Although the plate-shaped silicon bodies are observed to have a thickness of from about 10 nm to about 100 nm, a preferable thickness of the plate-shaped silicon bodies falls in a range of from 20 nm to 50 nm, from such viewpoints as the strength and the easiness of inserting lithium ions and so on thereinto and separating the ions therefrom. Moreover, the plate-shaped silicon bodies had actually a long-axis-direction length of from 0.1 μm to 50 μm, respectively. Note that preferable plate-shaped silicon bodies are believed to exhibit such an aspect ratio (i.e., "the long-axis-direction length"/"thickness") as from 2 to 1,000, respectively.

Figure 3:
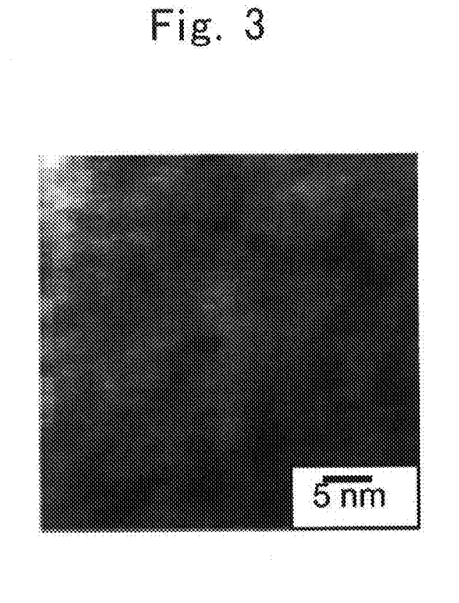
FIG. 3 shows a TEM/EELS image of the nanometer-size silicon material.
Figure 4:
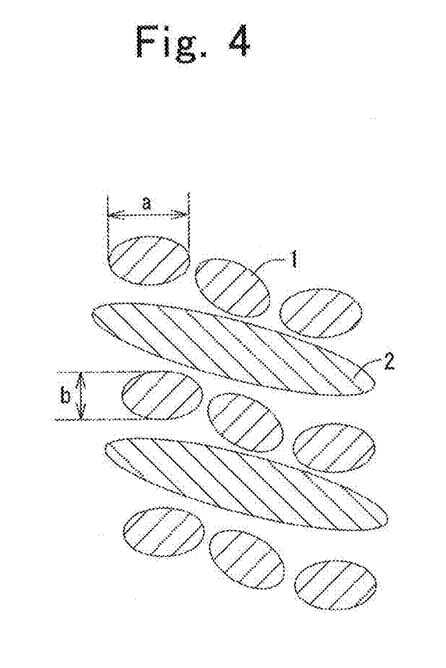
FIG. 4 is a schematic cross-sectional diagram showing a major part of a plate-shaped silicon body enlargedly.

In accordance with TEM (i.e., transmission electron microscopy)/EELS (i.e., electron energy loss spectroscopy), a shaded stripe-shaped structure is noticeable in the plate-shaped silicon bodies, as shown in FIG. 3. Note that FIG. 3 shows a diagram in which the squared part shown in FIG. 2 is enlarged, and that FIG. 4 shows a schematic cross-sectional diagram illustrating a major part of the plate-shaped silicon bodies enlargedly. The light gray-colored parts shown in FIG. 3 are believed to have a structure in which flat-shaped nanometer-size silicon particles "1" are oriented perpendicularly with respect to the long sides to arrange lamellarly; whereas the dark gray-colored parts existing between layers of the respective flat-shaped nanometer-size silicon particles "1" are believed to be voids and/or silicon oxides "2." The flat-shaped nanometer-size silicon particles "1" have a long-axis-direction length "a" of from 5 nm to 20 nm, have a short-axis-direction length "b" of from 2 to 5 nm, and have a ratio "a/b," namely, a ratio between the long axis and the short axis, which falls in a range of from 2.5 to 10. Moreover, a thickness of the voids and/or silicon oxides "2" is from 2 nm to 10 nm, and accordingly a ratio of the thickness of the voids and/or silicon oxides "2" with respect to the thickness of the flat-shaped nanometer-size silicon particles "1" comes to fall in a range of from 0.1 to 1.

Negative Electrode of Electric Storage Apparatus

The following steps enable the negative electrode of a nonaqueous-system secondary battery, for instance, to be fabricated using the negative-electrode active material according to the present invention: adding a proper amount of an organic solvent to a powder of the negative-electrode active material, a conductive additive like a carbon powder and a binder to mix the components one another to turn the components into a slurry; coating the slurry onto a current collector by such a method as a roll-coating method, a dip-coating method, a doctor-blade method, a spray-coating method or a curtain-coating method; and then drying or curing the binder.

The binder is required to bind the active material, and so on, together in an amount as less as possible. However, a desirable addition amount of the binder is from 0.5% by weight to 50% weight to a summed amount of the active material, conductive additive and binder. When the binder is less than 0.5% by weight, the formability of an electrode declines; whereas the energy density of an electrode becomes low when the addition amount exceeds 50% by weight.

For the binder, the following are exemplified: polyvinylidene fluoride (e.g., polyvinylidene difluoride (or PVdF)), polytetrafluoroethylene (or PTFE), styrene-butadiene rubber (or SBR), polyimide (or PI), polyamide-imide (or PAI), carboxymethylcellulose (orCMC), polyvinylchloride (or PVC), acrylic resins, methacrylic resins, polyacrylonitrile (or PAN), modified polyphenylene oxide (or PPO), polyethylene oxide (or PEO), polyethylene (or PE), polypropylene (or PP), polyacrylic acids (or PAA), and the like. Among the options, using polyvinylidene fluoride (e.g., polyvinylidene difluoride (or PVdF)) upgrades initial efficiency, and also upgrades cyclability.

A "current collector" means a chemically inactive high electron conductor for keeping an electric current flowing to electrodes during discharging or charging operations. Although a configuration, such as a foil or a plate, is adoptable for the current collector, the configuration is not at all limited especially as far as the configuration conforms to objectives. As the current collector, copper foils, and aluminum foils are usable suitably, for instance.

As the negative-electrode active material, the following publicly-known active materials, for instance, are also mixable with the above-mentioned lamellar polysilane or nanometer-size silicon material: graphite, hard carbon, silicon, carbon fibers, tin (Sn), silicon oxide, and the like. Among the publicly-known active materials, a silicon oxide expressed by $SiO_x$ (where $0.3 \leq x \leq 1.6$) is preferable especially. Each of particles in a powder of the silicon oxide is composed of $SiO_x$ having been decomposed into fine Si, and $SiO_2$ covering the Si by a disproportionation reaction. When the "x" is less than the lower-limit value, volumetric changes become too large at the time of charging and discharging operations because the Si ratio becomes so high, and thereby cyclability declines. Moreover, when the "x" exceeds the upper-limit value, the Si ratio declines so that energy density comes to decline. A preferable range is 0.5≤"x"≤1.5, and a more desirable range is 0.7≤"x"≤1.2.

In general, when being put under such a condition that oxygen is cut off, almost all of SiO has been said to separate into two phases at 800° C. or more. To be concrete, a silicon-oxide powder, which includes two phases, namely, a noncrystalline $SiO_2$ and a crystalline Si phase, is obtainable by carrying out to a raw-material silicon-oxide powder including a noncrystalline SiO powder a heat treatment at from 800 to 1,200° C. for from 1 to 5 hours in an inert atmosphere, such as in a vacuum or in an inert gas.

Moreover, as the silicon oxide, a composite is usable, composite in which a carbon material is composited with the $SiO_x$ in an amount of from 1 to 50% by mass. Compositing a carbon material upgrades cyclability. When a composited amount of the carbon material is less than 1% by mass, the advantageous effect of upgrading conductivity is not obtainable; whereas, when the composited amount exceeds 50% by mass, a proportion of the $SiO_x$ decreases relatively so that the capacity of a negative electrode has declined. A preferable composited amount of the carbon material falls in a range of from 5 to 30% by mass to the $SiO_x$, and a more desirable composite amount falls in a range of from 5 to 20% by mass thereto. A CVD method, or the like, is utilizable to composite the carbon material with the $SiO_x$.

A desirable silicon-oxide powder has an average particle diameter falling in a range of from 1 μm to 10 μm. When the average particle diameter is larger than 10 μm, the charging and discharging characteristics of an electric storage apparatus decline; whereas, when the average particle diameter is smaller than 1 μm, such a case arises probably that the charging and discharging characteristics of an electric storage apparatus decline similarly because the powder agglomerates to make coarse particles.

The conductive additive is added in order to enhance the electrically-conducting property of an electrode. As the conductive additive, the following are addable independently, or two or more of the following are combinable to add: carbonaceous fine particles, such as carbon black, graphite, acetylene black (or AB) and KETJENBLACK (or KB (registered trademark)); and gas-phase-method carbon fibers (or vapor-grown carbon fibers (or VGCF)). Although an employment amount of the conductive additive is not at all restrictive especially, setting the employment amount is possible at from 20 to 100 parts by mass approximately with respect to 100-part-by-mass active materials, for instance. When an amount of the conductive additive is less than 20% by mass, conductive passes with good efficiency are not formable; whereas, when the amount exceeds 100 parts by mass, not only the formability of an electrode worsens but also the energy density thereof becomes low. Note that, when using the silicon oxide composited with a carbon material as an active material, reducing an addition amount of the conductive additive, or making the addition amount none is possible.

To the organic solvent, any restrictions are not at all imposed especially, and even a mixture of multiple solvents does not matter at all. An especially preferable solvent is N-methyl-2-pyrrolidone, or a mixed solvent of N-methyl-2-pyrrolidone and an ester-based solvent (such as ethyl acetate, n-butyl acetate, butyl cellosolve acetate, or butyl carbitol acetate) or a glyme-based solvent (such as diglyme, triglyme, or tetraglyme).

When the electric storage apparatus according to the present invent ion makes a lithium-ion secondary battery, pre-doping the negative electrode with lithium is also possible. To dope the negative electrode with lithium, such an electrode chemically-forming technique is utilizable as assembling a half cell using metallic lithium for one of the counter electrodes and then doping the negative electrode with lithium electrochemically. The doping amount of lithium is not at all restricted especially.

When the electric storage apparatus according to the present invent ion makes a lithium-ion secondary battery, publicly-known positive electrodes, electrolytic solutions and separators are usable without any special limitations at all. An allowable positive electrode is positive electrodes being employable in nonaqueous-system secondary batteries. The positive electrode comprises a current collector, and a positive-electrode active-material layer bound together onto the current collector. The positive-electrode active-material layer includes a positive-electrode active material, and a binder, but the positive-electrode active-material layer further including a conductive additive is also permissible. The positive-electrode active material, conductive additive and binder are not at all limited especially, and accordingly are allowed to be constituent elements being employable in nonaqueous-system secondary batteries.

As for the positive-electrode active material, the following are given: metallic lithium, $LiCoO_2$, $LiNi_{1/3}Co_{1/3}Mn_{1/3}O_2$, $Li_2MnO_3$, sulfur, and the like. An allowable current collector is current collectors, such as aluminum, nickel and stainless steels, to be commonly employed for the positive electrodes of lithium-ion secondary batteries. An employable conductive additive is the same as the conductive additives set forth in the negative electrode mentioned above.

The electrolytic solution is a solution in which a lithium metallic salt, namely, an electrolyte, has been dissolved in an organic solvent. The electrolytic solution is not at all limited especially. As the organic solvent, an aprotic organic solvent is usable. For example, at least one member selected from the group consisting of the following is usable: propylene carbonate (or PC), ethylene carbonate (or EC), dimethyl carbonate (or DMC), diethyl carbonate (or DEC), ethyl methyl carbonate (or EMC), and the like. Moreover, as for the electrolyte to be dissolved, a lithium metallic salt, such as $LiPF_6$, $LiBF_4$, $LiAsF_6$, LiI, $LiClO_4$ or $LiCF_3SO_3$, being soluble in the organic solvent is usable.

For example, the following solution is employable: a solution comprising a lithium metallic salt, such as $LiClO_4$, $LiPF_6$, $LiBF_4$ or $LiCF_3SO_3$, dissolved in a concentration of from 0.5 mol/L to 1.7 mol/L approximately in an organic solvent, such as ethylene carbonate, dimethyl carbonate, propylene carbonate or dimethyl carbonate.

The separator is not at all limited especially as far as being separators being capable of being employed for nonaqueous-system secondary batteries. The separator is one of the constituent elements isolating the positive electrode and negative electrode from one another and retaining the electrolytic solution therein, and accordingly a thin microporous membrane, such as polypropylene or polyethylene, is usable.

When the electric storage apparatus according to the present invention makes a nonaqueous-system secondary battery, the configuration is not at all limited especially, and accordingly various configurations, such as cylindrical types, rectangular types and coin types, are adoptable. Even when any one of the configurations is adopted, the separators are interposed or held between the positive electrodes and the negative electrodes to make electrode assemblies. Then, after connecting intervals from the positive-electrode current collectors and negative-electrode current collectors up to the positive-electrode terminals and negative-electrode terminals, which lead to the outside, with leads for collecting electricity, and the like, the electrode assemblies are sealed hermetically in a battery case along with the electrolytic solution, thereby turning the positive-electrode and negative-electrode assemblies into a battery.

EXAMPLES

The embodiment modes of the present invention are hereinafter explained in detail by describing examples and comparative examples thereof.

First Example 20-mL HCl aqueous solution with a concentration of 36% by weight was cooled to 0° C. in an ice bath, and the following were added to the aqueous solution and were then stirred therein in an argon-gas atmosphere: 2-g calcium disilicide ($CaSi_2$) and 1-g copper acetate. After confirming that bubbling had completed, the temperature was increased up to room temperature, and then the mixture was further stirred at room temperature for two hours. Then, after adding 20-mL distilled water to the mixture, the mixture was further stirred for 10 minutes. On the occasion, a yellow-colored powder floated.

The obtained mixed solution was filtered, and a residue was then washed with 10-mL distilled water. After further washing the residue with 10-mL ethanol, the residue was vacuum dried to obtain 2-g lamellar polysilane.

A slurry was prepared by mixing the following one another: a powder of the obtained lamellar polysilane in an amount of 45 parts by mass; a powder of natural graphite in an amount of 40 parts by mass; acetylene black in an amount of 5 parts by mass; and a binder solution in an amount of 33 parts by mass. For the binder solution, a solution comprising polyvinylidene fluoride (or PVdF) dissolved in N-methyl-2-pyrrolidone (or NMP) in an amount of 30% by mass was used. The slurry was coated onto a surface of an electrolyzed copper foil (i.e., a current collector) having about 20 µm in thickness using a doctor blade, thereby forming a negative-electrode active-material layer on the copper foil. Thereafter, the current collector and the negative-electrode active-material layer were adhesion joined firmly by a roll pressing machine. The adhesion-joined substance was vacuum dried at 120° C. for 56 hours, thereby forming a negative electrode of which the negative-electrode active-material layer had a thickness of 16 µm.

Using as an evaluation electrode the negative electrode fabricated through the procedures mentioned above, a lithium secondary battery (i.e., a half cell) was fabricated. A metallic lithium foil with 500 µm in thickness was set as the counter electrode.

The counter electrode was cut out to φ14 mm, and the evaluation electrode was cut out to φ11 mm. Then, a separator composed of a glass filter produced by HOECHST CELANESE Corporation and "Celgard 2400" produced by CELGARD Corporation was set or held between the two to make an electrode-assembly battery. The electrode-assembly battery was accommodated in a battery case (e.g., a member for CR2032-type coin battery, a product of HOSEN Co., Ltd.). A nonaqueous electrolytic solution was injected into the battery case. Note that the nonaqueous electrolytic solution comprised a mixed solvent composed of ethylene carbonate and diethyl carbonate mixed one another in a ratio of 1:1 by volume, and $LiPF_6$ dissolved in the mixed solvent in a concentration of 1 M. Then, the battery case was sealed hermetically to obtain a lithium secondary battery.

Second Example

Using the lamellar polysilane synthesized in First Example, a negative electrode was formed in the same manner as First Example. Other than the following: using the negative electrode; and using, instead of the polyvinylidene fluoride (or PVdF), polyamide-imide (or PAI) as a binder, a lithium secondary battery (i.e., a half cell) was obtained in the same manner as First Example.

Third Example

Figure 5:
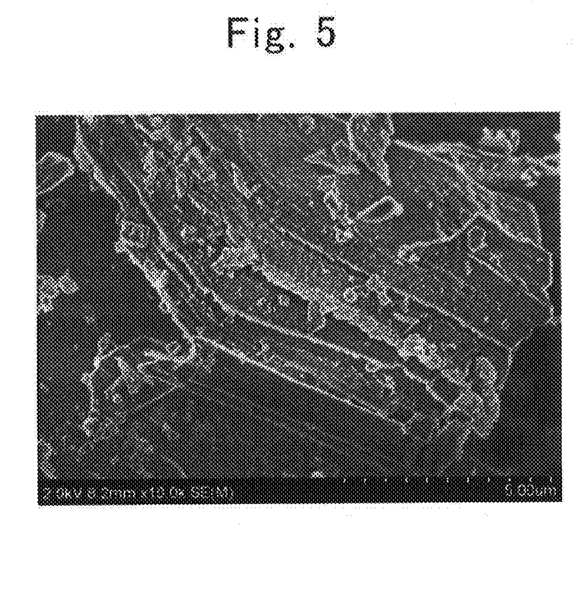
FIG. 5 shows an SEM image of a nanometer-size silicon material directed to Third Example.
Figure 6:
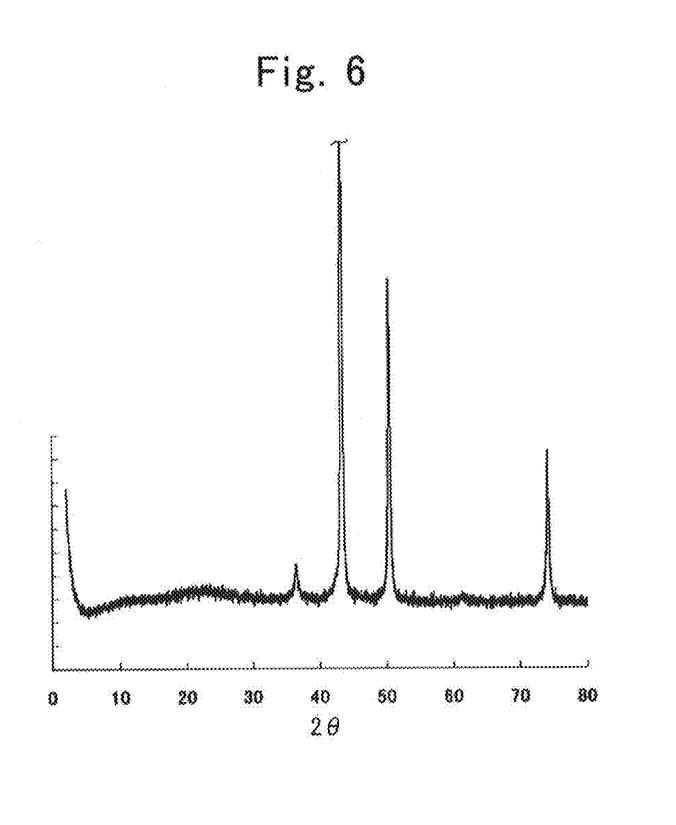
FIG. 6 shows an X-ray diffraction spectrum of the nanometer-size silicon material directed to Third Example.

The lamellar polysilane synthesized in First Example was weighed out in an amount of 1 g, and underwent a heat treatment in which the weighed-out lamellar polysilane was retained at 500° C. for 1 hour within an argon gas including $O_2$ in an amount of 1% by volume or less, thereby obtaining a powder of a nanometer-size silicon material. FIG. 5 shows an SEM image of the powder, and FIG. 6 shows an XRD diffraction chart thereof. In FIG. 5, the same structure as the structure in FIG. 1 is shown: the structure is made by laminating multiple plated-shaped silicon bodies one after another in the thickness direction. In FIG. 6, the peaks of Cu was observed at 2θ=43.3 deg., 50.43 deg., and 74.1 deg., and thereby the nanometer-size silicon material was understood to include Cu.

Other than using a powder of the nanometer-size silicon material instead of the lamellar polysilane, a lithium secondary battery (i.e., a half cell) was obtained in the same manner as First Example.

Fourth Example

Except that no copper acetate was added, a lamellar-polysilane powder was obtained in the same manner as First Example. A copper powder was mixed with the lamellar-polysilane powder so as to make 30% by mass with respect to the latter, and was then mixed fully with the latter by stirring. Other than using the mixed powder, a lithium secondary battery (i.e., a half cell) was obtained in the same manner as First Example.

First Comparative Example

Except that no copper acetate was added, a lamellar-polysilane powder was obtained in the same manner as First Example. Other than using the lamellar-polysilane powder, a negative electrode was formed in the same manner as First Example, and then a lithium secondary battery (i.e., a half cell) was obtained in the same manner as First Example.

Test on Battery Characteristics

Figure 7:
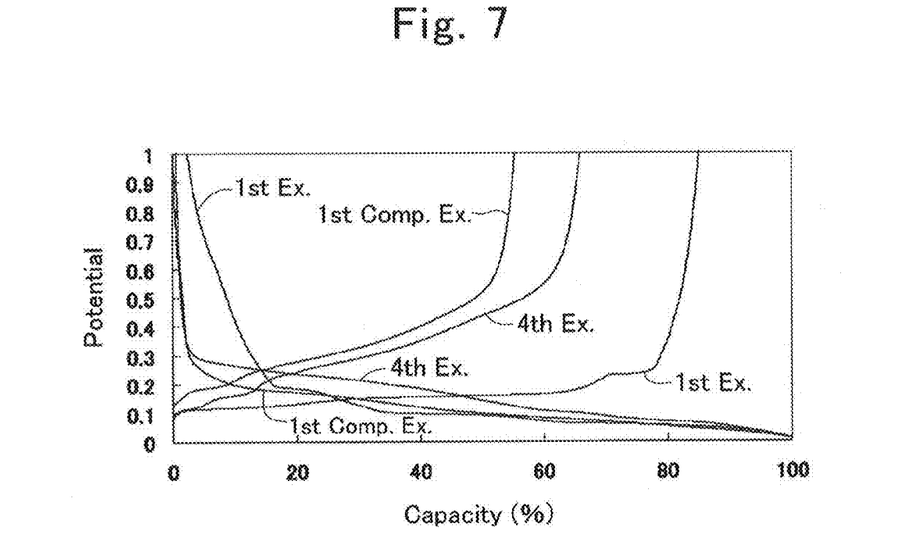
FIG. 7 shows charging and discharging curves of lithium-ion secondary batteries directed to First and Fourth Examples, and to First Comparative Example.

FIG. 7 shows initial charging and discharging characteristics of the lithium secondary batteries according to First and Fourth Examples and First Comparative Example upon charging the lithium secondary batteries with 1 V. The horizontal axis represents ratios when the discharged capacities were taken as 100, respectively.

From the comparison between Fourth Example and First Comparative Example, adding the copper powder was found out to augment the charged capacities. And, letting copper include at the time of the synthesis of the lamellar polysilane as done in First Example was found out to augment the charged capacities remarkably compared with the case where the copper was added after the synthesis.

Figure 8:
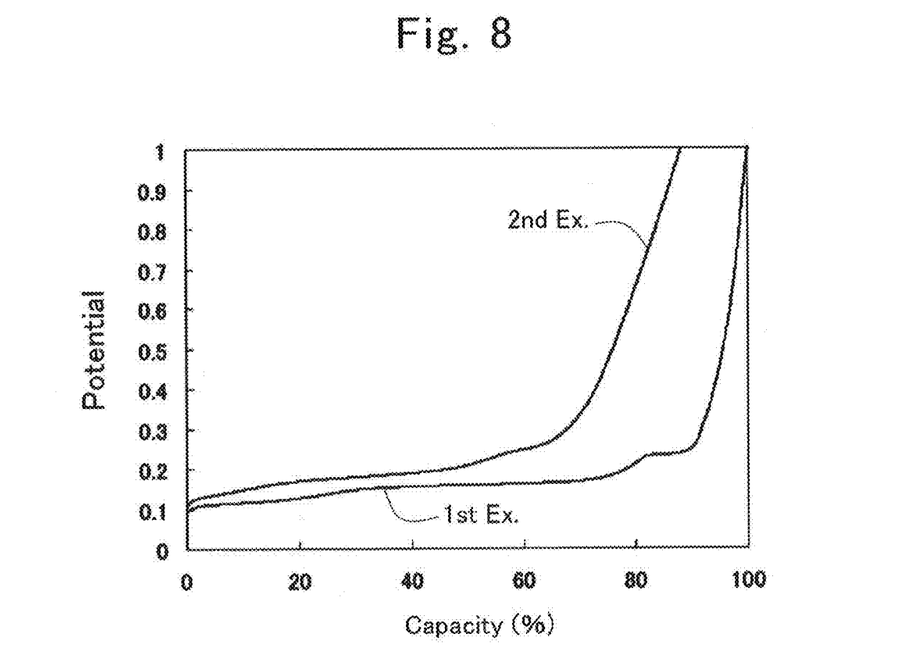
FIG. 8 shows charging curves of the lithium-ion secondary batteries directed to First and Second Examples.
Figure 9:
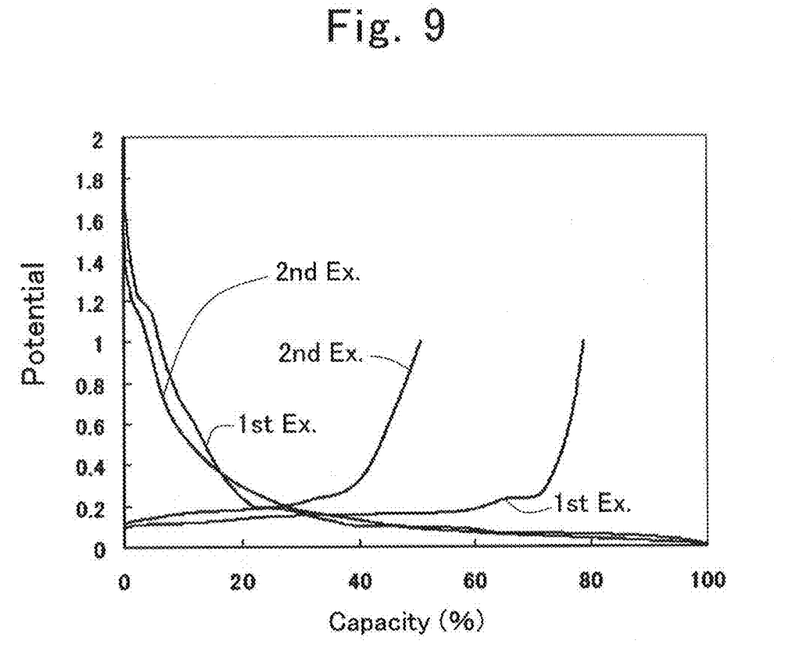
FIG. 9 shows other charging and discharging curves of the lithium-ion secondary batteries directed to First and Second Examples.

FIG. 8 shows initial charging characteristics of the lithium secondary batteries according to First and Second Examples upon charging the lithium secondary batteries with 1V. The horizontal axis represents ratios when the charged capacities were taken as 100, respectively. Moreover, FIG. 9 shows initial charging and discharging characteristics of the lithium secondary batteries upon charging the lithium secondary batteries with 1 V. The horizontal axis represents ratios when the discharged capacities were taken as 100, respectively.

From FIGS. 8 and 9, using polyvinylidene fluoride (or PVdF) as the binder of the negative-electrode active-material layer was found out to be more preferable than using polyamide-imide (or PAI).

Figure 10:
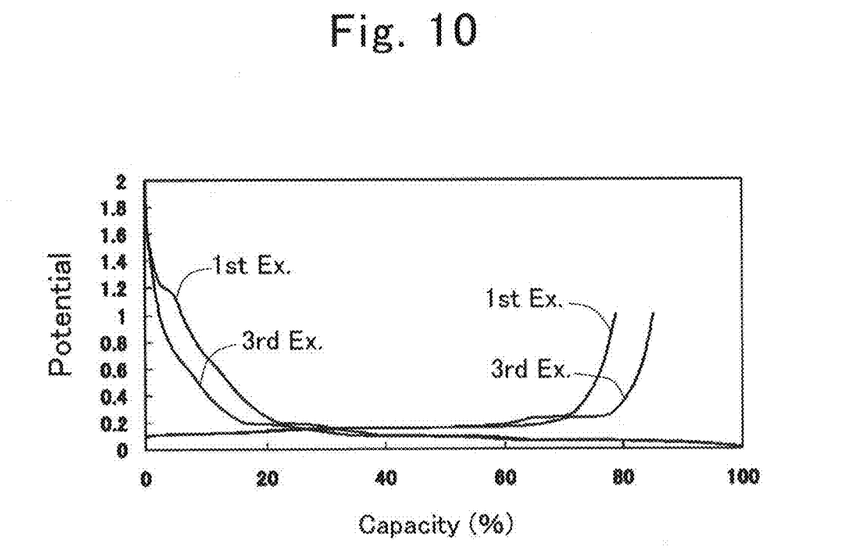
FIG. 10 shows charging and discharging curves of the lithium-ion secondary batteries directed to First and Third Examples.

FIG. 10 shows initial charging and discharging characteristics of the lithium secondary batteries according to First and Third Examples upon charging the lithium secondary batteries with 1 V. The horizontal axis represents ratios when the discharged capacities were taken as 100, respectively.

From FIG. 10, using the copper-containing nanometer-size silicon material as the negative-electrode active material was found out to be more preferable than using the copper-containing lamellar polysilane.

INDUSTRIAL APPLICABILITY

The electric storage apparatus according to the present invention is utilizable for secondary batteries, electric double-layer capacitors, lithium-ion capacitors, and the like. Moreover, the present electric storage apparatus is useful for nonaqueous-system secondary batteries utilized for driving the motors of electric automobiles and hybrid automobiles, and for personal computers, portable communication gadgets, home electric appliances, office devices, industrial instruments, and so forth. In particular, the present electric storage apparatus is usable suitably for driving the motors of electric automobiles and hybrid automobiles requiring large capacities and large outputs.

The invention claimed is:

1. A method of forming a negative-electrode active material comprising a nanometer-size silicon material including a lamellar polysilane, wherein the lamellar polysilane has a structure in which multiple six-membered rings constituted of a silicon atom are disposed one after another, and is expressed by a compositional formula, $(SiH)_n$, as a basic skeleton, wherein said nanometer-size silicon material is made by heat treating a copper-containing lamellar polysilane containing copper in an amount of from 0.01 to 50% by mass.

2. The method of forming a negative-electrode active material as set forth in claim 1, wherein said nanometer-size silicon material is made by heat treating said copper-containing lamellar polysilane at a temperature beyond 300° C.

3. The method of forming a negative-electrode active material as set forth in claim 1, wherein said nanometer-size silicon material is made by heat treating said copper-containing lamellar polysilane under a nonoxidizing atmosphere excepting a nitrogen gas.

4. The method of forming a negative-electrode active material as set forth in claim 1, wherein said nanometer-size silicon material is made by laminating a plate-shaped silicon body in a quantity of multiple pieces one after another in a thickness direction.

5. The method of forming a negative-electrode active material as set forth in claim 4, wherein said plate-shaped silicon body has a thickness of from 20 nm to 50 nm, and a long-axis-direction length of from 0.1 μm to 50 μm.

6. The method of forming a negative-electrode active material as set forth in claim 4, wherein the plate-shaped silicon body has an aspect ratio (i.e., "long-axis-direction length"/"thickness") of from 2 to 1,000.

7. The method of forming a negative-electrode active material as set forth in claim 4, wherein said plate-shaped silicon body possesses a structure in which flat-shaped nanometer-size silicon particles are arranged lamellarly.

8. The method of forming a negative-electrode active material as set forth in claim 7, wherein said flat-shaped nanometer-size silicon particles have a thickness of from 2 nm to 5 nm, and a long-axis-direction length of from 5 nm to 20 nm.

9. The method of forming a negative-electrode active material as set forth in claim 7, wherein said flat-shaped nanometer-size silicon particles have a ratio of from 2.5 to 10 between the long axis and the short axis (i.e., "the long axis"/"the short axis").

10. The method of forming a negative-electrode active material as set forth in claim 7, wherein the negative-electrode active material further comprises a void and/or a silicon oxide between layers of said flat-shaped nanometer-size silicon particles arranged lamellarly.

11. The method of forming a negative-electrode active material as set forth in claim 10, wherein a thickness of said void and/or silicon oxide is from 2 nm to 10 nm.

12. The method of forming a negative-electrode active material as set forth in claim 10, wherein a ratio of the thickness of said void and/or silicon oxide with respect to the thickness of said flat-shaped nanometer-size silicon particles is from 0.1 to 1.

13. A method of forming a copper-containing lamellar polysilane intended for use in a secondary-battery negative-electrode active material;

the copper-containing lamellar polysilane including a lamellar polysilane, wherein the lamellar polysilane has a structure in which multiple six-membered rings constituted of a silicon atom are disposed one after another, and is expressed by a compositional formula, $(SiH)_n$, as a basic skeleton; and the copper-containing lamellar polysilane containing copper in an amount of from 0.01 to 50% by mass; wherein the copper-containing lamellar polysilane is made by reacting calcium disilicide ($CaSi_2$), an acid pulling off calcium (Ca) from the calcium disilicide ($CaSi_2$), and a compound including copper one another.

14. A method of forming a copper-containing nanometer-size silicon including a copper-containing lamellar polysilane intended for use in a secondary-battery negative-electrode active material;

the copper-containing lamellar polysilane comprising:
  a lamellar polysilane having a structure in which multiple six-membered rings constituted of a silicon atom are disposed one after another, and expressed by a compositional formula, $(SiH)_n$, as a basic skeleton; and
  copper grown on the lamellar polysilane to be contained in an amount of from 0.01 to 50% by mass, wherein
said copper-containing nanometer-size silicon is made by heat treating said copper-containing lamellar polysilane.

15. A method of forming a negative-electrode active material comprising copper-containing nanometer-size silicon, wherein said copper-containing nanometer-size silicon is made by heat treating the copper-containing lamellar polysilane formed as set forth in claim 13.

16. An electric storage apparatus comprising a negative electrode including the negative-electrode active material formed as set forth in claim 1.

17. The electric storage apparatus as set forth in claim 16, wherein said negative electrode is composed of a current collector, and a negative-electrode active-material layer formed on the current collector, the negative-electrode active-material layer including polyvinylidene fluoride (or PVdF) as a binder.

18. A negative-electrode active material comprising said copper-containing nanometer-size silicon formed as set forth in claim 14.

* * * * *